United States Patent [19]

Luu et al.

[11] Patent Number: 5,370,773
[45] Date of Patent: Dec. 6, 1994

[54] CREPING ADHESIVES

[75] Inventors: Phuong V. Luu, Appleton, Wis.; Stephen R. Collins, Hampden, Me.; Cristian M. Neculescu, Neenah, Wis.

[73] Assignee: James River Corporation of Virginia, Richmond, Va.

[21] Appl. No.: 149,379

[22] Filed: Nov. 9, 1993

[51] Int. Cl.$^5$ .............................................. D21H 27/00
[52] U.S. Cl. ..................................... 162/111; 162/112; 162/113
[58] Field of Search ................ 162/111, 112, 113, 199

[56] References Cited

U.S. PATENT DOCUMENTS

| 4,440,597 | 4/1984 | Wells et al. | 162/111 |
| 4,482,429 | 11/1984 | Klowak | 162/111 |
| 4,551,199 | 11/1985 | Weldon | 162/111 |
| 4,849,054 | 7/1989 | Klowak | 162/111 |
| 4,992,140 | 2/1991 | Anderson et al. | 162/111 |
| 5,246,544 | 9/1993 | Hollenberg et al. | 162/111 |

Primary Examiner—Peter Chin

[57] ABSTRACT

Disclosed is a method for producing an absorbent creped cellulosic sheet having a high level of surface-perceived softness that comprises continuously forming a web of cellulosic papermaking fibers, adhering said web to a thermal drying means by means of an adhesive compositon that includes a non-self-crosslinkable polymer or oligomer having functional groups that can be crosslinked by ionic crosslinking, a metallic crosslinking agent having a valence of four or more, and a phosphate surfactant, and creping said treated web from said thermal drying means.

2 Claims, No Drawings

CREPING ADHESIVES

This invention relates to papermaking. More particularly, this invention is concerned with the manufacture of grades of paper that are suitable for use in paper toweling, napkins, facial tissue, and bathroom tissue (toilet paper) by methods that include creping.

BACKGROUND OF THE INVENTION

In the interest of editorial simplicity, this specification will focus on the production of "bathroom tissue". However, where the context allows, it should be understood that the technological principles of the present invention apply also to the manufacture of all lightweight absorbent grades of paper, including, for instance, facial tissue and paper toweling.

Paper is generally manufactured by suspending cellulosic fibers of appropriate length in an aqueous medium and then removing most of the water to form a web. The paper derives some of its structural integrity from the mechanical arrangement of the cellulosic fibers in the web, but most by far of the paper's strength is derived from hydrogen bonding which links the cellulosic fibers to one another. With paper intended for use as bathroom tissue, the degree of strength imparted by this interfiber bonding, while necessary to the utility of the product, results in a lack of perceived softness that is inimical to consumer acceptance. One common method of increasing the perceived softness of bathroom tissue is to crepe the paper. Creping is generally effected by fixing the cellulosic web to a Yankee drum thermal drying means with an adhesive/release agent combination and then scraping the web off of the Yankee by means of a doctor blade. Creping, by breaking a significant number of interfiber bonds, increases the perceived softness of resulting bathroom tissue product.

Obtaining and maintaining adhesion of tissue and towel products to Yankee dryers is an important factor in determing crepe quality. Inadequate adhesion results in poor or non-existing creping, whereas excessive adhesion may result in poor sheet quality and operational difficulties. Traditionally, creping adhesives alone or in combination with release agents have been applied either to the sheet or to the surface of the dryer in order to provide the appropriate adhesion to produce the desired crepe. Various types of creping adhesives have been used to adhere fibrous webs to dryer surfaces such as Yankee dryers. Some examples of prior art creping adhesives rely upon combinations of self-crosslinkable soft polymers having a $T_g$ of less than 10° C. with a non-film forming hard polymer emulsion having a $T_g$ of greater than 50° C. (U.S. Pat. No. 4,886,579). Some others involve thermoset resins (U.S. Pat. Nos. 4,528,316 and 4,501,640). The ability to control the mechanical properties of the polymers, as well as the adhesion and release of the fibrous web from the Yankee dryer, is limited when using these types of creping adhesives.

U.S. Pat. No. 5,246,544 describes an improved creping adhesive that provides the ability to readily control coating mechanical properties and adhesion, and which can be more easily removed from dryer surfaces. The adhesive system described in said patent provides high adhesion of a fibrous web to a dryer surface with low "friction". Having low friction means that the fibrous web can easily be removed from the dryer surface. This can be accomplished while at the same time reducing or inhibiting corrosion of the dryer surface. This is accomplished because the adhesion properties of the types of polymers taught to be useful according to the patented invention can be systematically changed by varying the amount of crosslinking that may occur when the polymer is dried onto the surface of a Yankee dryer. Because crosslink density influences the mechanical properties (that is, modulus, tensile strength, elongation, brittleness, $T_g$), this permits the adjustment of adhesion/release of the fibrous substrate onto the surface of the dryer. The nature of of the polymers and the types of crosslinker used according to the patent permits the incorporation of anti-corrosion components in the adhesive formulations.

Doctor blades are commonly used for effecting creping of paper in papermaking machines. Inasmuch as a doctor blade is normally in contacting relation with the surface of a rotating cylinder, the tip of the doctor blade is subject to wear. As wear progresses, the doctor blade's effectiveness tends to diminish. The doctor blades used for creping paper in a tissue papermaking machine precipitate progressively greater loss of machine-direction tensile strength of the paper as doctor blade wear progresses. This is particularly true in installations wherein the impact angle progressively changes as wear occurs. Commonly, in such machines, creping blades are changed (that is, replaced by new or newly sharpened blades) after a product property of particular importance (for instance, machine direction tensile strength) has been reduced to a predetermined minimum acceptable level by doctor blade wear, or after other observed deleterious ramifications of abnormal doctor blade performance. Changing creping blades requires considerable down-time and slows production greatly.

It is an object of the present invention to provide a creping adhesive system that will decrease adhesive-system-related wear on the doctor blade in tissue creping operations. The use of creping adhesive formulations in accordance with the present invention extends effective blade life by decreasing the overall level of blade wear while increasing the length of time that the creping doctor blade retains its uniformity.

SUMMARY OF THE INVENTION

Practice of the process aspect of the present invention provides an absorbent creped paper sheet having a basis weight of from about 7.5 pounds per ream to about 30 pounds per ream and comprising cellulosic papermaking fibers. Non-self-crosslinkable creping adhesives are used in combination with transition metal salt crosslinkers and phosphate surfactants to improve creping blade wear while protecting the surface of the drying drum from corrosion.

DETAILED DESCRIPTION OF THE INVENTION

In accordance with the present invention, a method is provided for producing a highly absorbent, predominantly cellulosic sheet that exhibits excellent overall quality and a high degree of surface-perceived softness. The present invention has utility in a wide variety of papermaking processes, including foam-forming, conventional pressed, and through-dried processes. Suitable apparatus configurations and processing parameters will be readily apparent to those skilled in the art. Some exemplary patents, hereby incorporated by reference for their disclosures of relevant papermaking processes and apparatus configurations, are U.S. Pat. Nos. 4,064,213, 4,304,625, and 5,178,729. For the sake of simplicity, however, the invention will be described immediately hereinbelow in the context of a conventional crepe wet-forming process.

In the method of the present invention, an aqueous furnish including cellulose papermaking fibers is initially formed. The cellulosic fibers have undergone some degree of lignin modification, such as at least partial chemical treatment, to produce materials such as chemimechanical pulp, semichemical pulp, chemical pulp, or mixtures thereof. Suitable materials from which the cellulose fibers can be derived include the usual species of coniferous and deciduous pulpwood. A minor amount of special purpose natural or synthetic fibers may also be included in the furnish if desired. Furnishes used may also contain or be totally comprised of recycled fibers (that is, secondary fibers).

The aqueous furnish is transported to a headbox at a concentration level sufficient to permit the formation of a substantially dry sheet upon completion of the hereinafter described dewatering and thermal-drying steps, without requiring further drying thereof subsequent to creping. The headbox can be any type suitable for conventional wet-forming or foam-forming. Multi-layer headboxes are generally used in the preparation of bathroom tissue, with three or four layer headboxes being particularly useful in the preparation of one-ply bathroom tissue. A conventional pulp refiner system may also be present upstream of the headbox. The addition of dry strength chemicals and refining are conventional procedures for adding strength back to paper when debonders or other chemical agents that tend to decrease strength are being used. As a practical matter, the consistency of the aqueous furnish used in forming the subject wet web is desirably maintained at a level of from about 0.05% by weight up to about 1.0% by weight, and more preferably from about 0.1% by weight up to about 0.75% by weight, based on the total weight of cellulosic papermaking fibers in the aqueous furnish.

A wet web is then formed by deposition of the aqueous furnish onto a web forming means, typically a conventional papermaking system including a foraminous conveying means such as a Fourdrinier wire or the like.

Dewatering of the wet web is then provided prior to the thermal drying operation, typically by employing a nonthermal dewatering means. The nonthermal dewatering step is usually accomplished by various means for imparting mechanical compaction to the web, such as vacuum boxes, slot boxes, coacting press rolls, or combinations thereof. For purposes of illustration of the method of this invention, the wet web may be dewatered by subjecting same to a series of vacuum boxes and/or slot boxes. Thereafter, the web may be further dewatered by subjecting same to the compressive forces exerted by nonthermal dewatering means such as, for example, a pair of rollers, followed by a pressure roll coacting with a thermal drying means. The wet web is carried by the foraminous conveying means through the nonthermal dewatering means, and is dewatered to a fiber consistency of at least about 5% up to about 50%, preferably at least 15% up to about 45%, and more preferably to a fiber consistency of approximately 40%.

The dewatered web is applied to the surface of thermal drying means, preferably a thermal drying cylinder such as a Yankee drying cylinder, employing an adhesive composition to supplement the adhesion process.

Under the definition of "Yankee" is included all large cast-iron drying cylinders on which towel, tissue, wadding, and machine-glazed papers are among the grades produced. Diameters typically range from 10-20 feet and widths can approach 300 inches. A typical diameter for a Yankee drying drum is 12 feet. Speeds in excess of 6000 ft/min at weights greater than 380,000 pounds are not uncommon. Dryers typically incorporate a center shaft and are supported on journals by two large anti-friction bearings. Steam, up to 160 psig (Code limitation for cast-iron unfired pressure vessels) is supplied through the front-side journal and exhausted, along with condensate, through the back-side journal. A typical steam pressure is 125 psig. Pressure rolls, one or two usually loaded between 200 and 500 pounds/linear inch, are employed to press the sheet uniformly against the shell face. The sheet is removed from the dryer several quadrants away, having been imparted with properties characteristic of the desired paper product.

Generally, the adhesive is applied to the Yankee prior to contacting the web with the Yankee. Alternatively, the creping adhesive can be applied to the surface of the fibrous web that will contact the dryer before the web is presented to the dryer. The method of application of the adhesive to the surface of the dryer or the web is not restricted to spray applications, although these are generally the simplest method for adhesive application.

Adhesion of the dewatered web to the cylinder surface is preferably facilitated by the mechanical compressive action exerted thereon, generally using one or more press rolls that form a nip in combination with thermal drying means. This brings the web into more uniform contact with the thermal drying surface.

The dewatered wet web after it is adhered to the Yankee dryer may optionally be treated with a softener material. Treatment of the wet web with the softener can be accomplished by various means. For instance, the treatment step can comprise spraying (as taught in U. S. patent application Serial No. 08/130,408, which was filed on Oct. 1, 1993, incorporated herein by reference), applying with a direct contact applicator means, or by employing an applicator felt.

An important aspect of this invention is the ability of the subject method to produce sheets in an extremely broad basis weight range. The basis weight of the sheet produced by the subject method can range from about 5 pounds per ream (3000 square feet) up to about 50 pounds per ream, preferably from about 7.5 pounds per ream up to about 30 pounds per ream, and most preferably from about 7.5 pounds per ream up to about 25 pounds per ream.

The Adhesive Composition

The creping adhesive composition according to the present invention is a non-self-crosslinkable material that is ionically crosslinkable, an appropriate crosslinking agent, and an internal lubricant.

The non-self-crosslinkable material may be a polymer or oligomer that contains crosslinkable functional groups selected from the group consisting of hydroxyl groups, carboxyl groups, sulfonate groups, phosphate groups, and mixtures thereof. Examples of typical adhesive compounds that may be used in accordance with the present invention are polyacrylate, polymethacrylate, polyvinyl alcohol, partially hydrolyzed polyacrylamide, partially hydrolyzed polymethacrylamide, carboxymethylcellulose, alginic acid, polysaccharide, a sulfonated polymer, and the like. More details on the non-self-crosslinkable material may be found in U.S. Pat. No. 5,246,544, which is hereby incorporated by reference.

The non-self-crosslinkable material should be present in the creping adhesive in an amount sufficient to provide the desired results in the creping operation. If it is intended to spray the creping adhesive onto the surface of the Yankee dryer, the creping adhesive should have a viscosity low enough to be easily sprayed yet high enough to provide a sufficient amount of adhesion. A sprayable creping adhesive will generally have a total solids content of about 0.01 to 0.5, and preferably from 0.03 to 0.2 % by weight based upon the total weight of the adhesive. The solids content of the adhesive composition according to the present invention is constituted primarily by the crosslinkable material, the crosslinker, and the internal lubricant.

Preferred crosslinking agents are ionic compounds, typically transition metal salts that provide ionic crosslinking between functional groups of the non-self-crosslinkable polymers or oligomers according to the invention. An added benefit of ionic crosslinking is that it is reversible at high pH and Yankee dryer temperature in the range of about 95°–105° C. The reversibility of crosslinking provides the flexibility to remove excess amounts of material that tends to build up on dryer surfaces. Metal cations with a valency of 4 or more may be used as the crosslinking agents. Salts and complexes of Group IV metals such as titanium, zirconium, and halfnium and Group VI metals such as chromium, molybdenum, and tungsten are preferred. Exemplary cations are $Cr^{+4}$, $Cr^{+6}$, $Ti^{+4}$, $Zr^{+4}$ and so on Zirconium has been found to be a particularly useful crosslinking agent because it is capable of crosslinking hydroxylated polymers as well as the more acidic carboxylated and sulfonated polymers, in addition to reacting with phosphate groups of phosphate surfactant. Although zirconium compound cations are the preferred crosslinkers, it has been found that mixtures of zirconium and aluminum ions are effective in providing crosslinking of complex polymers containing more than one type of functional group. For example, aluminum will crosslink carboxyl and sulfonate groups. Mixtures of polymers, for example, polyvinyl alcohol and polyacrylamides (partially hydrolyzed) can be effectively crosslinked using mixtures of aluminum and zirconium ions. The crosslinker will usually be added to the creping adhesive in the form a a water-soluble salt or water-soluble complex that provides cations upon dissolution in water. An example of one particularly useful complex is ammonium zirconium carbonate.

The crosslinker should be present in the creping adhesive in an amount sufficient to provide changes in the mechanical properties of the polymer once the solution has been evaporated and the polymer crosslinked. Increased crosslinking generally will increase the $T_g$ and/or modulus, increase the brittleness and hardness, and provide different responses to mechanical stress relative to uncrosslinked polymers. Obtaining the appropriate crosslink density will depend not only on the relative concentration of added crosslinker but also on the type of polymer employed, the functional groups present, and the molecular weight of the polymer. For most of the polymers used in the present invention, the amount of crosslinker, that is, the material that provides the cations, necessary to promote improvements in adhesion is in the range of 0.5 to 10% by weight based on the weight of the polymer to be crosslinked.

The internal lubricant is typically a phosphate surfactant. The internal lubricant is a low molecular weight material that, when mixed with the polymer (as opposed to being applied topically), migrates to the polymer-air interface. Such partitioning of the lubricant from the bulk results in a high lubricity surface coating which reduces friction between it and the doctor blade while not adversely affecting the sheet-to-dryer adhesion. It may be used in amounts of up to 15% by weight based upon the weight of the adhesive polymer. A phosphate surfactant level of 5 to 10 weight percent based upon polymer weight is preferred. Phosphate ester surfactants, which are preferably in the form of their fugitive base salt for practicing the invention, include complex organic phosphate esters, complex organic polyphosphoric ester acid anhydrides, phosphate esters of complex aliphatic or aromatic hydroxyl compounds, phosphate esters of long chain linear and branched alcohols and alcohol ethers, such as phosphate esters of isooctyl, 2-ethylhexyl, cetyl, oleyl, and tridecyl alcohols, phosphated fatty glycols and glycol esters, phosphated mono- and diglycerides, mono- and dialkyl and alkyl aryl phosphate esters, phosphated polyether alcohols, such as poly(oxyethylene)phosphates, mono- and dialkyl and alkyl aryl poly(oxyethylene) acid phosphates, such as phosphated nonylphenoxyethanol. Preferred are the phosphate monoesters of alkyl or alkyl aryl poly(oxyethylene) ethanols of the general formula: $R-(-CH_2CH_2O-)_n-PO_3H_2$ wherein R is hydroxy or the residue of a fatty alcohol, acid, amide, or amine having from 8 to 18 carbon atoms, phenol, or an alkylphenol having from 10 to 18 carbon atoms and n is an integer from 2 to 14. Currently most preferred are compounds of the formula $$HO-(-CH_2CH_2O-)_{10-14}-PO_3H_2$$

While the polymer, the crosslinker, and the internal lubricant are the major "active" ingredients in the adhesive compositions of the present invention, other materials can be incorporated with beneficial results. Glycols and other polyols, including sugars and oligosaccharides may be added to the compositions or may actually be incorporated into the crosslinked polymer. Conventional surfactants such as Triton (Rohm & Haas) and the Pluronic or Tetronic surfactants (BASF) can be incorporated in the present invention to improve surface spreading or wetting capabilities. Mineral oils or other low molecular weight hydrocarbon oils or waxes can be included to modify interfacial phenomena. As taught in U.S. Pat. No. 4,883,564, phosphate salts such as potassium phosphate and potassium polyphosphate may also be included in the creping adhesive formulation.

The various components of the adhesive formulation, that is, non-self-crosslinking polymer, crosslinking agent, internal lubricant, and optionally surfactants and anti-corrosive additives, may all be dissolved, dispersed, suspended, or emulsified in a liquid carrying fluid. This liquid will generally be a non-toxic solvent such as water. The liquid component is usually present in an amount of 90 to 99% by weight of the total weight of the creping adhesive. The pH of the adhesive when it is applied to the desired surface in the papermaking operation will normally be about 7.5 to 11. The solvent preferably consists essentially or completely of water. If other types of solvents are added, they are generally added in small amounts. Alternatively, the crosslinker and phosphate surfactant can be sprayed onto the adhesive after it is applied to the Yankee but before the wet web is adhered to it.

EXAMPLES

The headbox of a crescent former papermaking machine was provided with a homogeneous pulp mixture consisting of 50% softwood (pine) and 50% hardwood (gum) diluted with water to a consistency of 0.5%. The watered pulp was delivered through a slice opening of 0.45 inches to a forming wire moving at 3000 feet per second to form a wet web. After dewatering the wet web on a felt also moving at 3000 feet per second, the (partially) dewatered web was transferred by means of a suction pressure roll set at 75 psig to an adhesive-coated Yankee dryer drum rotating at 3000 feet per second. The adhesive coating composition consisted of 0.4 active parts per ton of polyvinyl alcohol (Air Products AIRVOL ® 540), 0.02 active parts per ton of phosphate surfactant (Witco EMPHOS ™ PS 220), 1 active part per ton of Houghton 565 release agent, and varying amounts of ammonium zirconium carbonate ("AZC") as shown in Table 1. The dried web was creped off of the Yankee at an angle of 18° to form a tissue having a basis weight of approximately 10 pounds per 3000-square-foot ream.

Crepe blade wear rate was calculated as flank wear rate. Results are reported in Table 1.

TABLE 1

| Blade # | Adhesive/ Release #/Ton | Phosphate Surfactant #/Ton | AZC #/Ton | Wear Width Average μm | Std. Dev. |
|---|---|---|---|---|---|
| 1 | 0.4/1 | .02 | 0 | 228.4 | 49.9 |
| 2 | 0.4/1 | .02 | 0 | 219.2 | 42.8 |
| 3 | 0.4/1 | .02 | 0 | 199.2 | 27.3 |
| 4 | 0.4/1 | .02 | 0 | 264.4 | 42.2 |
| 5 | 0.4/1 | .02 | 0 | 209.6 | 26.6 |
| 6 | 0.4/1 | .02 | .03 | 172.5 | 7.8 |
| 7 | 0.4/1 | .02 | .03 | 164.6 | 18.4 |
| 8 | 0.4/1 | .02 | .03 | 210.8 | 12.7 |
| 9 | 0.4/1 | .02 | .05 | 223.2 | 14.9 |
| 10 | 0.4/1 | .02 | .05 | 200.6 | 13.3 |
| 11 | 0.4/1 | .02 | .05 | 212.8 | 13.1 |
| 12 | 0.4/1 | .02 | .05 | 212.8 | 11.5 |
| 13 | 0.4/1 | .02 | .05 | 226.4 | 22.1 |

An uneven blade wear rate profile was produced when using a creping adhesive formulation that does not correspond to the present invention. This is shown by the relatively high standard deviations for the average blade wear results reported for blades 1–5. The standard deviation reported here is an indication of the variation in the width of the blade wear region in the cross-machine direction (i.e., along the blade length). It is thus an indication of how evenly the blade wears. Larger standard deviations would normally correlate to increased non-uniformity of creping. In addition, the high points of wear would cause a crepe blade to fail prematurely, even if the average wear across the blade were comparable to other coating formulations. Use of coating formulations according to the present invention (blades 6–13) resulted in blade wear profiles that generally were quite uniform.

In addition to improving the blade wear profile, the present invention provides lower blade wear, as measured by a lower blade wear index, which is defined as the ratio of wear width to the square root of time. For blades 1–5 (where an adhesive composition not in accordance with the present invention was used), the blade wear index was 161 μm/hr$^{\frac{1}{2}}$. For blades 9–13, the blade wear index was lower at 152 μm/hr$^{\frac{1}{2}}$, and for blades 6–8 the blade wear index was only 129 μm/hr$^{\frac{1}{2}}$.

Crepe wavelength was determined using the STFI procedure with a low angle light shadowing analysis. Results are reported in Table 2.

TABLE 2

| Sample No. | Adhesive/ Release #/Ton | Phosphate Surfactant #/Ton | AZC #/Ton | Wave Length μm |
|---|---|---|---|---|
| 1 | 0.4/1 | .02 | 0 | 297 |
| 2 | 0.4/1 | .02 | 0 | 304 |
| 3 | 0.4/1 | .02 | .03 | 281 |
| 4 | 0.4/1 | .02 | .05 | 276 |
| 5 | 0.4/1 | .02 | .05 | 282 |

Lower crepe wavelengths are obtainable when creping using the creping adhesive composition according to the present invention. Lower crepe wavelength means a finer crepe was being produced, which generally gives rise to lower surface friction and higher levels of perceived softness.

The invention being thus described, it will be obvious that the same may be varied in many ways. Such variations are not to be regraded as a departure from the spirit and scope of the invention, and all such modifications as would be obvious to one skilled in the art are intended to be included within the scope of the following claims.

I claim:

1. A method for producing an absorbent cellulosic sheet having a high level of surface-perceived softness that comprises continuously;
   a) preparing an aqueous dispersion of cellulosic papermaking fibers,
   b) forming a web of said cellulosic papermaking fibers and dewatering said web to about 5 to about 50% consistency,
   c) adhering said web to a thermal drying means with an adhesive composition comprising a non-self-crosslinkable polymer or oligomer having functional groups that can be crosslinked by forming hydrolyzable ionic crosslinks, a metallic crosslinking agent having a valence of four or more, and a phosphate surfactant as an internal lubricant,
   d) creping said treated web from said thermal drying means, wherein said internal lubricant is present in an amount such that the crepe wavelength is decreased relative to crepe wavelength produced by creping with said adhesive in the absence of said internal lubricant, thereby providing a higher degree of perceived softness,
   wherein said phosphate surfactant is a member selected from the group consisting of the phosphate monoesters of alkyl or alkyl aryl poly (oxyethylene) ethanols of the general formula:

R—(—CH$_2$CH$_2$O—)$_n$—PO$_3$H$_2$ 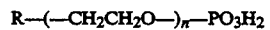

wherein R is hydroxy or the residue of a fatty alcohol, acid, amide, or amine having from 8 to 18 carbon atoms, phenol, or an alkylphenol having from 10 to 18 carbon atoms and n is an integer from 2 to 14.

2. A method of creping a fibrous web from a thermal drying means that comprises providing to the interface of a fibrous web and a heated support surface for the fibrous web a reversibly crosslinked creping adhesive that contains;

a) a non-self-crosslinkable material which is a polymer or oligomer having functional groups that can be crosslinked by ionic crosslinking,
b) in an amount sufficient to promote improvement in adhesion, at least one metallic crosslinking agent having a valence of four or more which is capable of crosslinking said non-self-linkable polymer or oligomer by forming hydrolyzable ionic crosslinks,
c) in an mount sufficient to decrease wear to said support surface and/or to the doctor blade used to effect said creping, an internal lubricant wherein the internal lubricant is a phosphate ester surfactant of the formula:

$$HO-(-CH_2CH_2O-)_{10\text{-}14}-PO_3H_2$$

and d) removing said fibrous web from said support surface by creping it off with a doctor blade.